Patented May 14, 1929.

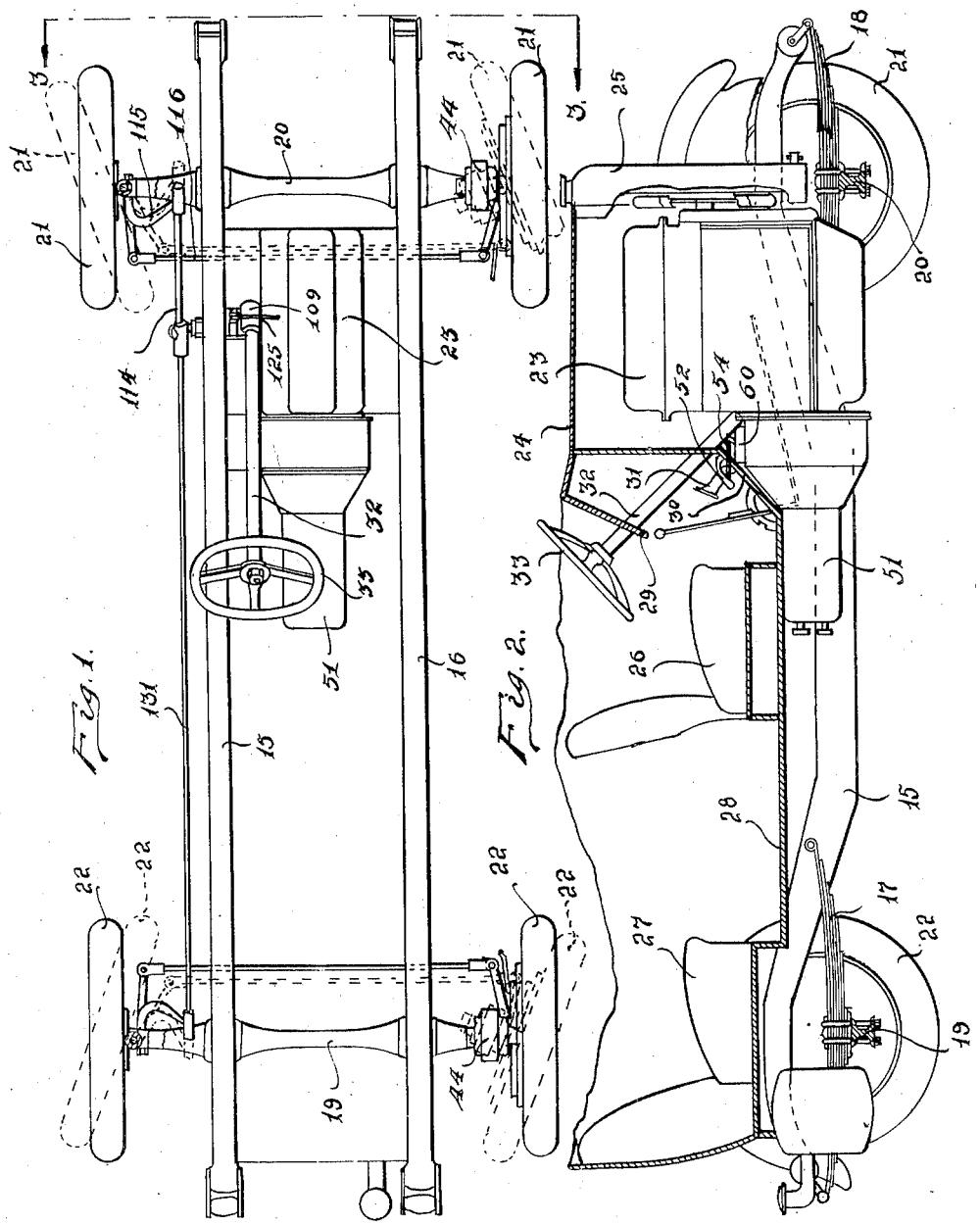

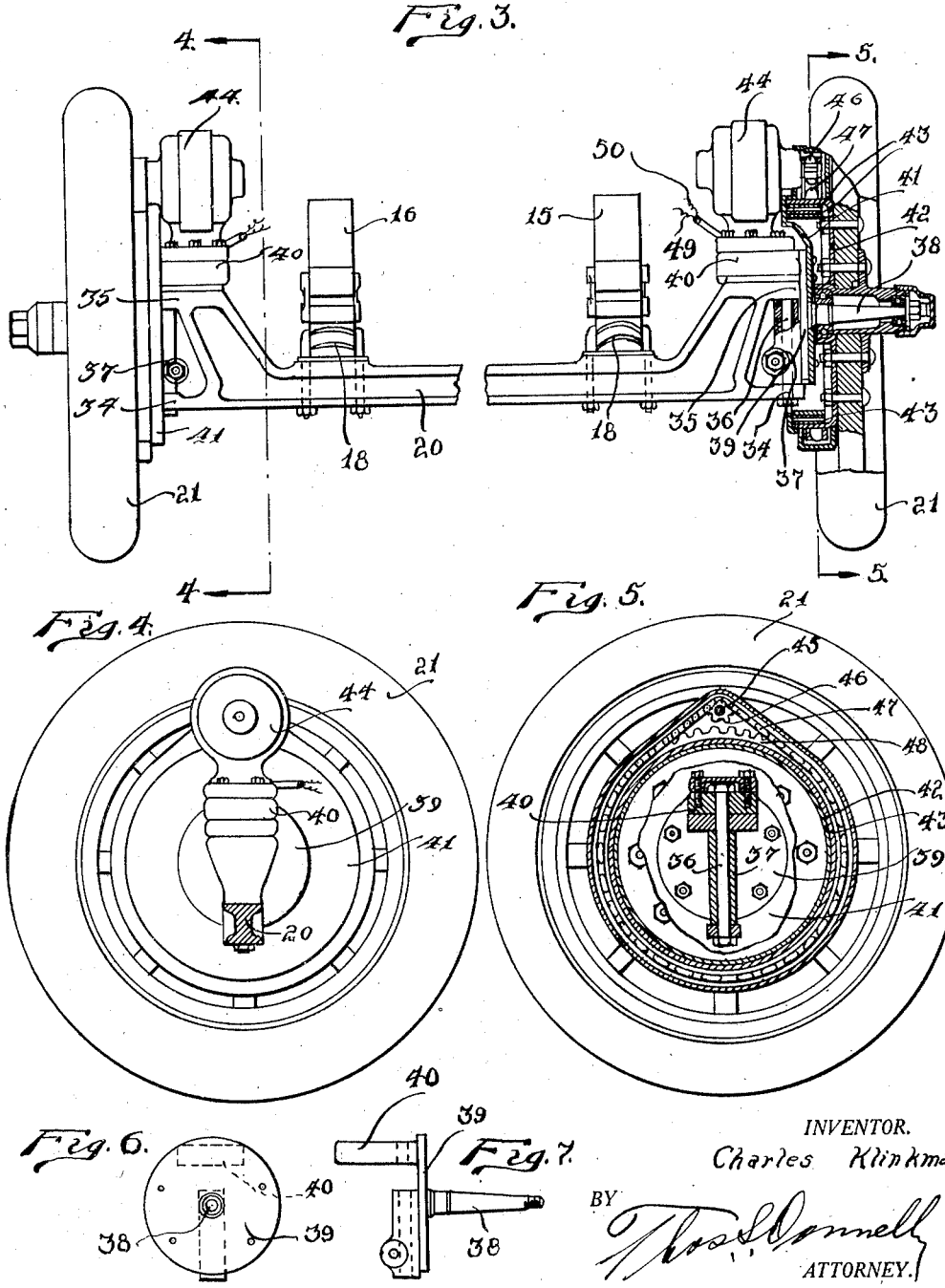

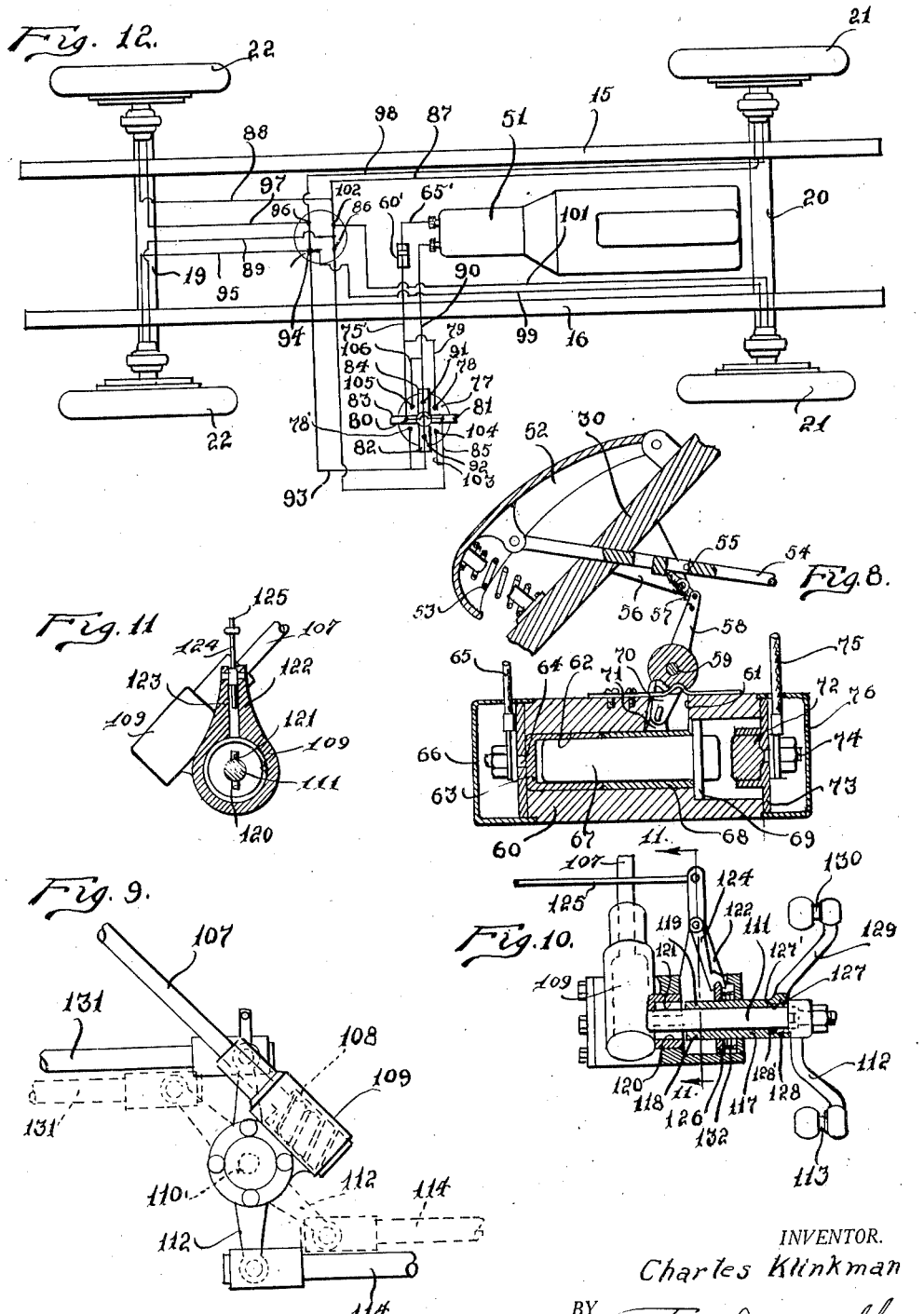

1,713,084

UNITED STATES PATENT OFFICE.

CHARLES KLINKMAN, OF DETROIT, MICHIGAN.

DRIVING AND STEERING MECHANISM FOR VEHICLES.

Application filed November 29, 1926. Serial No. 151,361.

My invention relates to a new and useful improvement in a steering mechanism, and has for its object the provision of a driving mechanism whereby each of the wheels of the vehicle may be provided with its individual driving mechanism independently operable.

Another object of the invention is the provision of a steering mechanism whereby the front and rear wheels may be angularly turned co-operatively for effecting a turning of the vehicle.

Another object of the invention is the provision of a steering mechanism whereby the rear wheels may be turned in conjunction with the front wheels, and whereby at will, the steering mechanism of the rear wheels may be rendered inoperative, so as to permit a steering by angularly turning at will the front wheels.

Another object of the invention is the provision of a driving mechanism for each of the wheels adapted to co-operate with a steering mechanism whereby each of the wheels may be angularly turned, the driving mechanism being so mounted as to angularly turn with the wheels.

Another object of the invention is the provision in a gas electrical driven vehicle of means for opening and closing the contact to the electric propelling means as the gas is fed to the gas operated engine.

Other objects will appear hereinafter.

The invention consists in the combination and arrangement of parts hereinafter described and claimed.

The invention may be best understood by a reference to the accompanying drawings which form a part of this specification and in which, Fig. 1 is a top plan view of a chassis showing the invention applied.

Fig. 2 is a central longitudinal sectional view of a vehicle showing the invention applied.

Fig. 3 is a front elevational view of a chassis showing the invention applied with parts broken away and parts in section.

Fig. 4 is a view taken on substantially line 4—4 of Fig. 3.

Fig. 5 is a sectional view taken on line 5—5 of Fig. 3.

Fig. 6 is a front elevational view of the steering knuckle.

Fig. 7 is a side elevational view of Fig. 6.

Fig. 8 is a longitudinal vertical sectional view of a contact closing mechanism.

Fig. 9 is a fragmentary end elevational view of the steering mechanism.

Fig. 10 is a fragmentary side elevational view of the steering mechanism with parts broken away and parts shown in section.

Fig. 11 is a sectional view taken on line 11—11 of Fig. 10.

Fig. 12 is a diagrammatic view showing the wiring used in the invention looking from above.

In the drawings I have illustrated the invention applied to a conventional automobile provided with a chassis having the side rails 15 and 16, and the springs 17 and 18. A rear axle 19 is mounted on the chassis as is likewise a front axle 20. Front wheels 21 are mounted on the axle 20 and rear wheels 22 are mounted on the axle 19, the method of mounting these wheels being the same and a description of the mounting will follow.

The gasoline engine 23 of conventional type is mounted beneath the engine hood 24 in the usual manner, the radiator 25 being also illustrated. Seats 26 and 27 are mounted on the floor 28 of the body. The body is shown provided with an instrument board 29 and a dash or foot board 30, projecting through which is the pedal 31 used for operating the brakes. A steering post column 32 is provided and the steering wheel 33 is mounted on the steering post.

I am aware that vehicles have been produced in which the gasoline electric drive system is used, and the parts mentioned above are well-known, and a detail description of the same is not given as these parts of themselves form no specific part of the present invention.

The axle 20 and the axle 19 are duplicates of each other and the method of mounting the several wheels at opposite ends of these axles is the same so that a description of the mounting of one of the wheels will suffice for all of them.

As shown in Fig. 3 the axle 20 is provided with bracket forming arms 34 and 35 to provide a yoke. Through these arms 34 and 35 the pintle or bolt 36 is projected, the knuckle sleeve 37 being rotatably mounted on the bolt 36. As shown in Figs. 3, 6 and 7, the spindle or axle 38 projects outwardly from a disc 39 which is carried by the knuckle 37. Projecting rearwardly from the disc 39 is a bracket or bench 40. Secured to the disc 39 is a cover 41 for the brake drum 42 in which operates the brake 43. This braking mechanism is not a part of the present invention, and since it may be of conventional design, it is not specifically described.

Fixedly mounted upon the bench or bracket 40 an electric motor 44 upon the shaft 45 of which is fixedly mounted the sprocket or gear wheel 46 adapted to engage the chain 47, passes around the gear wheel 48 mounted on the periphery of the drum 42. Suitable wires 49 and 50 connect to the motor 44 for furnishing the electric current. An electric generator 51 is connected to the crank shaft of the engine 23 so that when the engine 23 is operated, the generator 51 may be driven to generate electric current.

Mounted on the foot board 30 of the engine pivotally is an accelerator 52 which is normally held in outwardly pressed position by means of the spring 53. Pivotally connected to the accelerator 52 is the accelerator rod 54 which serves to control the supply of fuel to the motor 23. This rod 54 is provided with a plurality of notches or openings 55. Pivotally connected on the bracket 56 which projects downwardly from the foot board 30 is a link 57 which is pivotally connected at one end to a link 58 and adapted to engage at its opposite end the under surface of the rod 54. The link 58 is pivotally connected on the shaft 59, the construction and arrangement being such that as the accelerator 52 is rocked downwardly to furnish a supply of gasoline to the motor 23 the link 54 will rock on its pivot, the notches 55 serving to permit a quick passage of the link 57 to snap into these openings so as to partially lock the link 58 in rocked position. Mounted in a suitable position beneath the foot board 30 is an insulating block 60 in which is provided a recess 61 and a central bore 62. Positioned in the bore 62 at the rear end thereof is a metallic cup 63 projecting outwardly from the base of which is a terminal post 64 connected to the cable 65. A suitable cap 66 is provided to cover the terminal post and its connection with the cable 65. Slidably mounted in the cup 64 and in the bore 62 is a metallic stud 67 positioned about which at one end is an insulating sleeve 68 which engages at one end the collar 69 fixedly mounted upon the stud 67. Projecting outwardly from the sleeve 68 is a bracket 71 which is pivotally connected to the bracket 70 which is pivotally mounted on the shaft 59 so that as the link 58 is rocked in one direction the arm 70 will be rocked in the opposite direction. A contact 72 projects into a contact formed in the insulating block 60, a suitable support 73 being attached to the insulating block to retain this contact 72 in position. Projecting outwardly from the contact block 72 is a terminal post 74 to which is attached the cable 75. The construction is such that as the accelerator is pressed downwardly to supply gas to the engine the sleeve 68 engaging the collar 69 will force the stud 67 into engagement with the contact 72 so as to close the circuit between the wires 65 and 75. A suitable cap 76 is provided for the terminal post 74. This contact member is interpositioned in one of the wires leading from the generator 51 and is shown in the diagrammatic view in Fig. 12, the wire 65' leading into the contact 60' and the wire 75' leading out from it, the wire 65' corresponding to the wire 65 shown in Fig. 8, and the wire 75' corresponding to the wire 75, shown in Fig. 8. It is thus seen that the accelerator controls not only the delivery of fuel to the gas engine 23, but also the delivery of current from the generator 51.

In the diagrammatic view I have illustrated a contact plate 77 which may be positioned on the instrument board or in any other convenient position accessible to the driver of the vehicle. The contact 78 is mounted on the plate 77 connected by the wire 79 to the wire 75' which is connected through the make and break mechanism to one pole of the generator 51. A contact 80 is also connected through the wire 75' to the generator 51. Rotatably mounted on the plate 77 is a cross comprising the arms 81 and 82, 83 and 84, these arms being such that when the contact 80 is engaged by the arm 83, the circuit will be closed between the wire 75' and the wire 85, this wire leading to a contact 86 and from thence through the wire 87 to one of the motors used to drive one of the wheels 21. The wire 88 also connects electrically to the wire 85 and to one of the motors used for driving one of the rear wheels 22. The wire 89 similarly connects one of the motors driving one of the rear wheels to the wire 85. Leading from the other pole of the generator 51 is the wire 90 which connects with the terminal 91 and through the arms 84 and 82 to the wire 93 which connects to the contact 92, this wire 93 connecting to the contact 94. The wire 95 leads from the contact 94 to one of the motors driving one of the rear wheels, thus forming a circuit to this motor. The wire 97 leads from the contact 96 which is electrically connected to the contact 94 to the other motor driving the other rear wheel, thus forming a circuit to this motor. The wire 98 leads from the contact 96 to one of the motors used for driving the front wheel forming a circuit to this motor. The wire 99 leads from the contact 94 to the other forward wheel and motor driving the other forward wheel and the wire 101 leads from the contact 102 to this same motor, thus forming a circuit to this motor. Connected to a contact 104 is a wire 103 which connects to the wire 85 and connecting to the wire 90 is a wire 106 which connects with the contact 105. The construction is such that as the cross is rotated on the plate 77 bringing the arm 83 into engagement with the contact 105, the arm 81 will engage the contact 104, thus connecting these two contacts electrically. At the same time, the contact 78 will be electrically connected with the contact 78', thus reversing the flow of current in the various circuits to effect a reverse operation of the driving motors. This reversing mechanism may be termed a reversing switch as a movement of it into one position will effect a forward operation of the motors, and a movement of it into the other position will effect a reverse operation of the motors.

The steering mechanism comprises the usual form of steering post 107 carrying the screw 108, mounted in the housing 109 and adapted to rotate the shaft 110. This shaft 110 is provided with an extension 111. Fixedly mounted upon the shaft 111 is an arm 112 having the lateral projection 113 to which may be attached the radius rod 114, which is connected in the usual manner through the arm 115 to the steering knuckle which is provided with the tie rod 116. This connection is of a conventional type. Slidably mounted on the rod 111 is a sleeve 117 fixedly mounted upon which and projecting outwardly therefrom at one end is an arm 129 provided with the lateral extension 130 which is adapted for connection to the operating rod 131. Projecting from the rearward side of the sleeve 117 are diametrically oppositely positioned extensions or fingers 118 and 119 adapted to engage in radially extending notches 120 and 121 respectively formed in the housing 109. Projecting outwardly from the housing are brackets 122 and 123 between which is pivoted a lever 124 connected at its outer end to the operating rod 125 which extends to a position easily accessible to the operator of the vehicle. The other end of the lever 124 is forked to engage at opposite sides of the ring 126 which is fixedly mounted on the sleeve 117. Keys 127 and 128 connecting the arm 112 to the shaft 111 are extended rearwardly and adapted to engage upon movement of the sleeve 117 into its operative or forward position in longitudinal extending grooves 127' and 128' respectively, formed in the inner surface of the sleeve 117. The construction is such that when the lever 124 is rocked on its pivot the sleeve 117 may be moved longitudinally of the shaft 111, this movement in one direction effecting a compression of the spring 132, the spring 132 normally retaining the sleeve 117 in its rearwardly moved or inoperative position.

The construction is such that when the sleeve 117 is moved into the position shown in Fig. 10, the sleeve 117 will rotate in unison with the shaft 111, thus effecting an angular turning simultaneously and in cooperative relation of the forward wheels 21 and the rearward wheels 22, the rod 131 being connected in a conventional manner to effect angular turning of the wheels 22. It is thus seen that the rear and front wheels may both be angularly turned for steering purposes at will. When the sleeve 117 is rotated with the shaft 111 to effect an angular direction of the wheels 22, the projections 118 and 119 on the sleeve 117 will be moved out of alignment with the openings 121 and 122. Therefore in order to move the sleeve 117 into a position so that it will be disengaged from the keys 127 and 128 it will be necessary that the wheels 22 be in longitudinal alignment with the chassis of the vehicle. When the wheels are moved into this position the projections 118 and 119 will register with the grooves or openings 120 and 121 and the sleeve 117 may then be moved rearwardly so as to disengage from the keys 127 and 128, the projections 118 and 119 through their engagement in the grooves 120 and 121 locking the sleeve 117 against rotation so that the rear wheels 22 will be locked in fixed position relatively to the chassis. The shaft 111 may, however, be rotated to effect an angular turning of the forward wheels 21 so that the forward wheels 21 alone may be used for steering purposes.

It is believed obvious that as the gas engine 23 is speeded up the generator 51 will also be speeded up, thus applying a larger amount of electrical energy to the electric motors 44 which are used for driving the wheels. Consequently, the control of the speed of the gas engine will control the speed of the motors 44.

In this manner I have provided a vehicle in which the front and rear wheels may be used for steering jointly and in which the rear wheels may be fixed relatively to the chassis at will, so that the front wheels alone may be used for steering purposes.

With a vehicle having a drive for each wheel it is obvious that an economical structure may be provided in that a differential and transmission mechanism may be dispensed with. It is also believed obvious that a rotation of all of the wheels of the vehicle may be effected at all times so that the objectionable features of the differential, particularly when the vehicle is subjected to an unusual load, are eliminated.

While I have illustrated and described the preferred form of construction, I do not wish to limit myself to the precise form of structure shown, but desire to avail myself of such variations and modifications as may come within the scope of the appended claims.

Having thus described my invention what I claim as new and desire to secure by Letters Patent is:

1. A vehicle of the class described comprising a pair of front wheels; a pair of rear wheels, each of said pairs of wheels being adapted for turning angularly for steering purposes; a steering post; a shaft rotatable upon rotation of said steering post; an arm fixedly mounted upon and projecting radially outwardly from said shaft; a rod connected to said arm; means for connecting said rod to one of said pairs of wheels for effecting angular turning of said pair of wheels upon rotation of said steering post; and means movable axially of said shaft and rotatable thereby upon movement axially thereof in one direction beyond a predetermined distance; and means for connecting said axially movable means to the other set of wheels for effecting angular turning thereof upon rotation of said axially movable means.

2. A vehicle of the class described comprising a pair of front wheels; a pair of rear wheels, each of said pairs of wheels being adapted for angular turning for steering purposes; a steering post; a shaft rotatable upon rotation of said steering post; an arm fixedly mounted upon and projecting radially outwardly from said shaft; a rod connected at one end to said arm; means for connecting the opposite end of said rod to one of said pairs of wheels; a sleeve slidably positioned on said shaft and movable axially thereof; an arm mounted on said sleeve and projecting radially outwardly therefrom; a rod connecting said second mentioned arm to the other set of wheels, said rods effecting angular turning of said wheels upon rotation of said steering post.

3. A vehicle of the class described comprising a pair of front wheels; a pair of rear wheels, said wheels being adapted for angular turning for steering purposes; a steering post; a shaft rotatable upon rotation of said steering post; an arm fixedly mounted on said shaft and rotatable upon rotation of said steering post; a rod connected at one end to said arm; means for connecting the opposite end of said rod to one pair of said wheels, and effecting angular turning of said wheels upon rotation of said steering post; a sleeve mounted on said shaft and movable axially thereof; an arm projecting outwardly from said sleeve, said sleeve being non-rotatable of said shaft upon movement to one position, and said shaft being rotatable in said sleeve upon movement of said sleeve to another position; a rod connected at one end to said second mentioned arm and at its opposite end to the other of said pairs of wheels, and effecting angular turning of said wheels upon rotation of said second mentioned arm.

4. A vehicle of the class described comprising a pair of front wheels; a pair of rear wheels, said wheels being adapted for angular turning for steering purposes; a steering post; a shaft rotatable upon rotation of said steering post; an arm fixedly mounted on said shaft; a rod connected at one end to said arm; means for connecting the opposite end of said rod to one set of said wheels for effecting angular turning of the same upon rotation of said post; a sleeve slidable axially of said shaft; means for locking said sleeve against rotation upon movement of the same in one direction on said shaft a predetermined distance; means for rotating said sleeve in unison with said shaft upon movement of said sleeve on said shaft a predetermined distance in the opposite direction; an arm projecting outwardly from said sleeve; a rod connected at one end to said second mentioned arm and at its opposite end to said other pair of wheels for effecting angular turning of the same upon rotation of said sleeve; and means for moving said sleeve said distances in either direction of said shaft.

In testimony whereof I have signed the foregoing.

CHARLES KLINKMAN.